TELEGRAPH TRANSMITTER DISTRIBUTOR STARTING MECHANISM

Original Filed Dec. 14, 1961 3 Sheets-Sheet 1

INVENTOR.
ARTHUR A. HAGSTROM
BY E. T. Kane
ATTORNEY

TELEGRAPH TRANSMITTER DISTRIBUTOR STARTING MECHANISM

Original Filed Dec. 14, 1961 3 Sheets-Sheet 2

INVENTOR
ARTHUR A. HAGSTROM
BY E. F. Kane
ATTORNEY

TELEGRAPH TRANSMITTER DISTRIBUTOR STARTING MECHANISM

Original Filed Dec. 14, 1961 3 Sheets-Sheet 3

INVENTOR
ARTHUR A. HAGSTROM

BY E. A. Kane

ATTORNEY

United States Patent Office

Re. 26,080
Reissued Sept. 20, 1966

26,080
TELEGRAPH TRANSMITTER DISTRIBUTOR STARTING MECHANISM

Arthur A. Hagstrom, Roselle, Ill., assignor to Teletype Corporation, Skokie, Ill., a corporation of Delaware Original No. 3,133,988, dated May 19, 1964, Ser. No. 159,240, Dec. 14, 1961. Application for reissue Feb. 3, 1966, Ser. No. 532,506
9 Claims. (Cl. 178—17)

Matter enclosed in heavy brackets [ ] appears in the original patent but forms no part of this reissue specification; matter printed in italics indicates the additions made by reissue.

This invention relates to keyboard controlled printing telegraph transmitting apparatus and more particularly to mechanism selectively operable to permit or prevent repeated transmission of permutation code signals representative of a character upon the operation of a key in the keyboard representative of said character.

A primary object of the invention is to improve and simplify keyboard controlled telegraph transmission.

Another object of the invention is to improve keyboard controlled telegraph transmission by providing a simplified clutch trip mechanism for them.

A still further object of the invention is to provide a reliable mechanism for tripping the clutch of a keyboard controlled telegraph signal transmitting apparatus.

A more specific object of the invention is to provide the simplest possible mechanism for tripping the transmitter clutch of a printing telepgraph apparatus and preventing accidental repetition of the transmission of a selected code combination while still selectively permitting the repeated transmission of a selected code combination.

In accordance with the preferred embodiment of the invention a keyboard controlled printing telegraph apparatus is provided having a plurality of permutatively settable code members which are actuated by keys which close contacts selectively in accordance with the code for selectively completing circuits to contact segments of a distributor and wherein a universal control member is arranged to be operated each time any one of the keys in the keyboard is operated for initiating a cycle of operation of the distributor by actuating a clutch trip lever to connect the distributor to a power source and wherein the clutch trip mechanism is normally blocked against operation and is released for operation and then automatically restored to blocking position through a series of simple levers which may be disabled upon the operation of a special key in the keyboard to repeat the transmission of a selected character.

A complete understanding of the invention may be had by reference to the following detailed description when considered in conjunction with the accompanying drawings wherein.

Figures 1, 7:
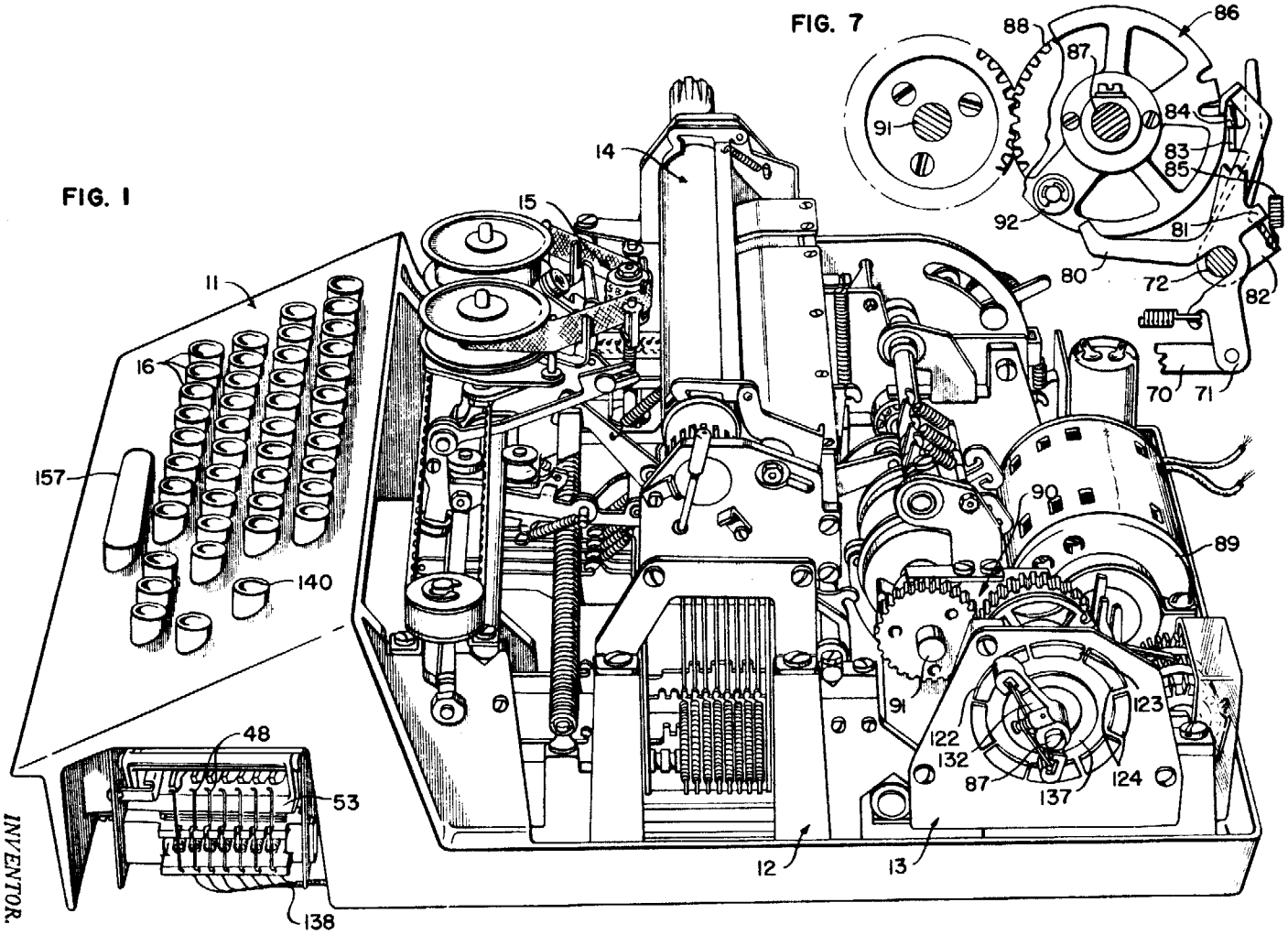
FIG. 1 is a perspective view of a printing telegraph apparatus having a keyboard and provided with a selectively operable control mechanism comprising the preferred embodiment of the present invention.
FIG. 7 is a fragmentary sectional view taken just behind the distributor and showing part of the clutch tripping and resetting mechanism.

Referring now to the drawings wherein like reference characters designate the same parts throughout the several views and referring particularly to FIG. 1, it will be seen that a keyboard 11 is provided that is designed for utilization primarily in a printing telegraph page printer which includes in addition to the keyboard, a main casting 12 on which there are suitably mounted a distributor 13, a platen assemblage 14 and a type wheel assemblage 15. The distributor preferably is of the type described in detail and claimed in the copending application of K. Alonas, A. A. Hagstrom and B. J. Sobczak, Serial No. 159,328, filed December 14, 1961, the disclosure of which is incorporated herein by reference insofar as necessary to afford a complete understanding of this invention.

The keyboard 11 may be used, simply as a transmitter controlling keyboard, but as pointed out hereinbefore, it is primarily designed for use with the page printer illustrated in FIG. 1, which in addition to effecting transmission of a message prints a monitor copy of the transmitted message by utilizing the platen assemblage 14 and type wheel assemblage 15. These assemblages may be operated under control of signals generated by the distributor 13 to print a home or monitor record of any message transmitted by the distributor 13 under control of the keyboard 11.

The specific type of page printer with which the present invention is preferably used, is disclosed in detail and is claimed in the copending application of W. J. Zenner, Serial No. 159,330, filed December 14, 1961, the disclosure of which is incorporated herein by reference insofar as it is necessary to an understanding of the present invention. Similarly, the keyboard mechanism disclosed herein is disclosed in detail and claimed in the copending application of L. C. Anderson, Jr., and A. A. Hagstrom, Serial No. 159,324, filed December 14, 1961, which is also incorporated herein by reference insofar as necessary to provide a complete understanding of the present invention.

Figure 2:
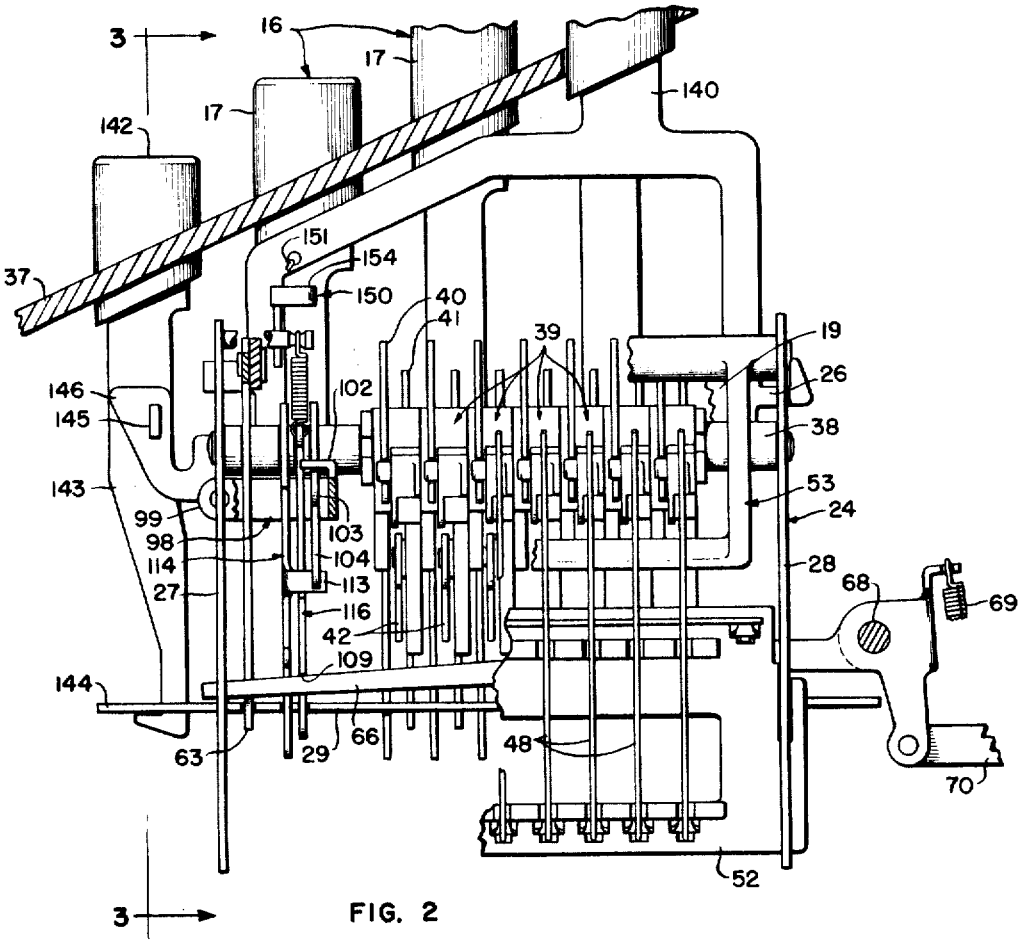
FIG. 2 is a transverse sectional view taken through the keyboard adjacent to the right end thereof as viewed from an operator's position.

In the keyboard there are provided a plurality of character keys 16 having keytops 17 attached to key stems 18 which are formed integrally with cross members 19 and with depending portions 20. The cross members 19, as viewed in FIG. 2, are each provided with a notch 26 which serves to hold the keys in position in a box-like structure 24 which forms the main supporting framework for the keys in the apparatus. The box-like structure 24, as is disclosed in greater detail in the aforementioned application to L. C. Anderson and A. A. Hagstrom, comprises a sheet metal blank having a front wall 27, a rear wall 28 and a bottom 29 and has a series of slots 30 with closed ends and a series of open ended slots 31 (FIG. 3), formed in the front and rear walls 27 and 28, respectively. The slots 30 and 31 alternate throughout most of the length of the front and rear walls 27 and 28 in such a manner that a slot 30 in the rear wall will be directly opposite a slot 31 in the front wall and vice versa. This box-like structure with slots in it cooperates with a top plate 37 in guiding the keys for vertical reciprocation. The depending portions 20 of the stems on the keys extend through slots in the bottom 29 of the box-like structure 24 and are normally held in an upward position by leaf springs 25, individual to them, which are suitably fixed to the under side or bottom of the structure 24.

Figure 6:
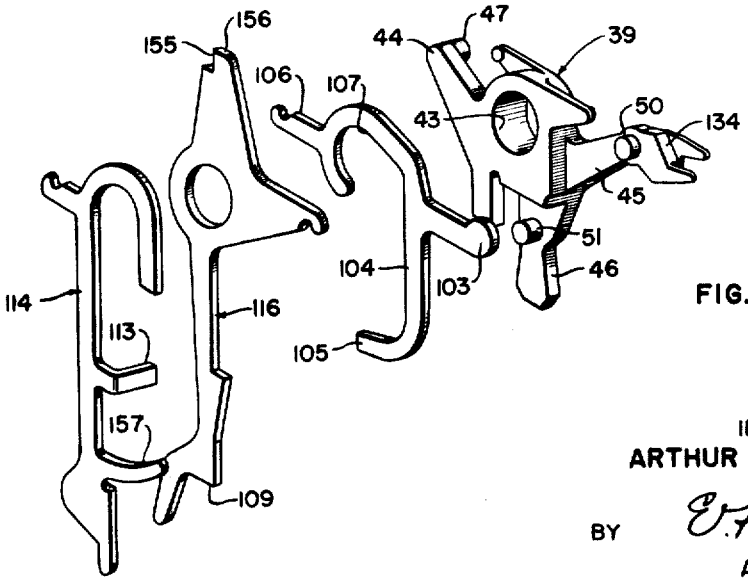
FIG. 6 is an exploded view showing some of the repeat controlling parts in perspective.

The front and rear walls 27 and 28 of the box-like structure 24, in addition to serving as guides for the keys 16, also support a pivot rod 38 on which there are positioned a plurality of T-levers 39. There are two of the pivot rods 38 provided, one adjacent each end of the box-like structure 24, and only one of these pivot rods has been shown. T-levers 39 are mounted on both of the pivot rods 38 and a pair of the T-levers 39, one of which is positioned at each end of the box-like structure 24, serve to support and guide a pair of code bars 40 and 41 and a tie bar 42. All of the T-levers 39 are of exactly the same construction and each of them has a bearing aperture 43 (FIG. 6) for receiving the pivot rod 38 on which the T-levers are mounted whereby the T-levers 39 are readily oscillatable about their respective pivot rods 38. Each of the T-levers 39 as illustrated in FIG. 6 is provided with a pair of code bar pivot arms 44 and 45 formed on it and the code bar pivot arms 44 and 45 have code bar pivots 47 and 50 projecting from them for supporting the code bars 40 and 41, respectively. Each of the T-levers 39 also has a tie bar pivot arm 46 having a tie bar pivot 51 extending from it.

The construction of these T-levers is described in greater detail and claimed in the aforementioned copending application of L. C. Anderson, Jr., and A. A. Hagstrom and as clearly described therein the T-levers so support the code bars 40 and 41 and the tie bar 42 that when one of the code bars 40 or 41 is pushed downwardly due to the operation of a character key 16 the other one of the code bars will be moved upwardly. The code bars 40 and 41 have coded projections 49 on them whereby, when a particular character key 16 is actuated by an operator, the code bars 40 and 41 will be permutatively actuated to either release or flex a contact spring 48 associated with it.

Figure 3:
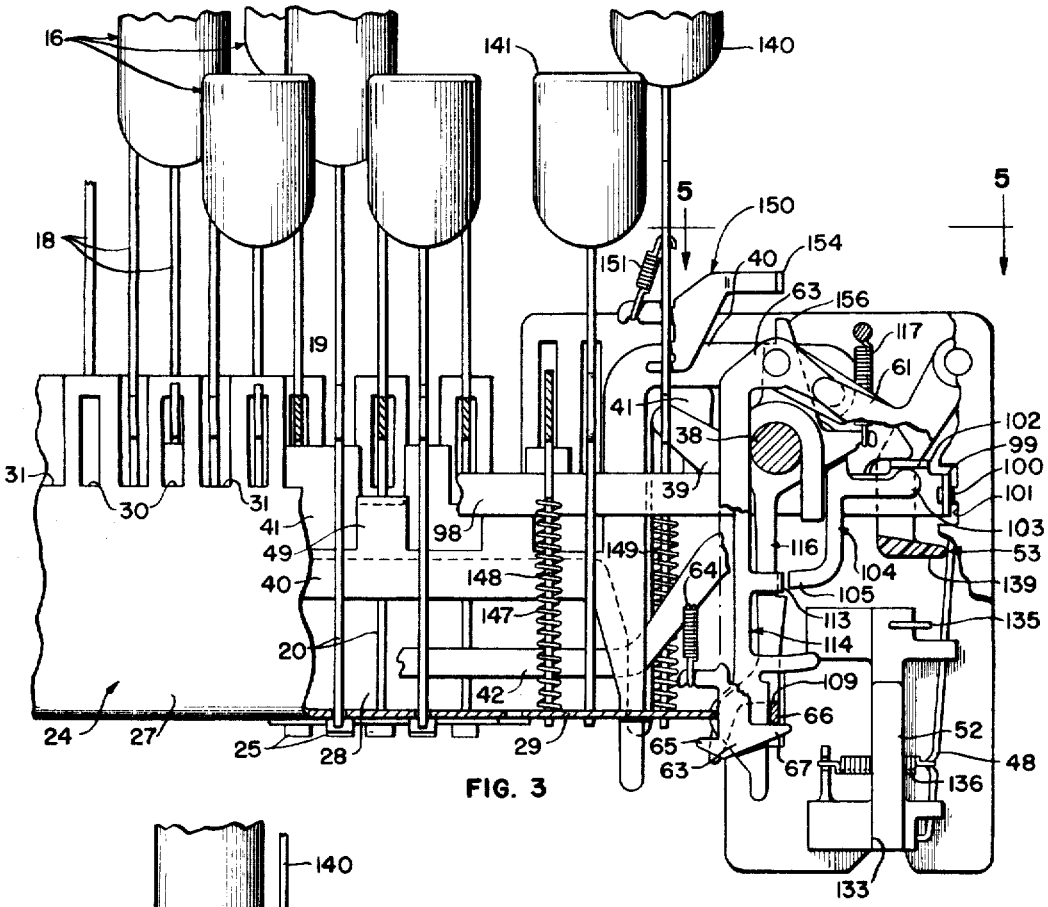
FIG. 3 is an elevational view taken substantially along the line 3—3 of FIG. 2 in the direction of the arrows, parts being broken away, more clearly to illustrate the apparatus behind them.

The operation of the keys 16 in the keyboard will control the operation of the contact springs 48 in the same manner as described in the aforementioned copending application of L. C. Anderson, Jr., and A. A. Hagstrom. The contact springs 48 are suitably mounted on a block of insulating material 52 in the manner described in the copending application of A. A. Hagstrom, Serial No. 159,228 filed December 14, 1961, now Patent No. 3,084,-218. After a code combination representing a character has been transmitted by the distributor 13 in accordance with the setting of the contact springs 48, the contact springs are all restored to an unoperated position, as indicated in FIG. 3, by a contact spring restoring bail 53 which is pivoted for oscillation in the front wall 27 and rear wall 28 of the box-like structure 24. This bail 53 has an arm 61 carrying a stud 62 which is entered into a suitable aperture in a restoring lever 63 and this restoring lever 63 has a portion of it bearing against the pivot rod 38 whereas the lower end of its slides against the right edge of the bottom 29 of the structure 24. The restoring lever 63 is normally urged upwardly by a contractile spring 64 to the position shown in FIG. 4 where a lip 65 on the lever 63 will engage the bottom surface of the bottom 29 of the box-like structure 24. In the unoperated condition of the apparatus the restoring lever 63 is held in the position shown in FIG. 3 by a clutch trip lever 66 which engages a projection 67 of the restoring bail 63. The clutch trip lever 66 is pivoted on a shaft 68 suitably supported in the apparatus and is urged to rock in a clockwise direction (FIG. 2) by a contractile spring 69.

The clutch trip lever 66 has pivotally connected to it a clutch trip link 70 (FIGS. 2 and 7) which is in turn pivotally connected to a tripping lever 71, that is pivoted on a clutch trip shaft 72. The tripping lever 71 has reset extension or restoring arm 80 formed on it and also has a stop bail actuating arm 81 formed on it. The stop bail actuating arm 81 rests against the web portion of a stop bail 82 which has formed on it a clutch stop 83 that is carried in the path of a clutch shoe 84. The stop bail 82 is urged to rock in a counterclockwise direction (FIG. 7) about the shaft 72 by a contractile spring 85 to carry the clutch stop 83 into the path of the shoe 84 thereby disconnected a clutch cam disc 86 from a distributor drive shaft 87. This clutch mechanism is of the type shown and claimed in the patent to A. N. Nilsen et al. No. 2,568,259, issued September 18, 1951.

When the clutch trip link 70 is moved to the left, FIG. 7, it will, through the tripping lever 71 and stop bail 82, move the stop 83 out of the path of the shoe 84 to initiate a cycle of rotation of the shaft 87 by interconnecting the shaft with a gear 88 which is connected to a motor 89 (FIG. 1) by suitable gearing 90. This gearing also drives a main power shaft 91 which is the same as the main power shaft 39 shown in the aforementioned application of W. J. Zenner. From the foregoing it is believed to be apparent that each time the clutch trip link 70 is moved to the left a cycle of rotation of the distributor shaft 87 will be initiated. Near the end of the cycle of rotation of the clutch cam disc 86 and the shaft 87 a restoring roller 92 on the cam disc 86 will engage the reset extension or restoring arm 80 to rock the tripping lever 71 counterclockwise thereby to permit the clutch stop 83 to move back into the path of the shoe 84.

The actuation of the clutch tripping lever 71 to trip the clutch 86 is effected each time a key 16 in the keyboard 11 is depressed and this operation is initiated through the oscillation of a universal bail 98. This universal bail 98 has a pair of forwardly extending arms 99 formed on opposite ends of it and each of the arms 99 has a suitable aperture in it for receiving a cooperating projection 100 that extends from a side wall of an aperture 101 formed in the front wall 27 of the box-like structure 24. The projections 100, which are at opposite ends of the keyboard, serve as pivots for pivotally supporting the universal bail 98. The bail 98 extends across the width of the keyboard transversely of the cross members of the keys 16 and will be rocked about the projections 100 in a counterclockwise direction (FIG. 2), each time a key 16 in the keyboard 11 is depressed. The universal bail 98 has a forwardly extending lip 102 formed on it (FIG. 2), which extends over an arm 103 of a trip lever 104. The trip lever 104 is of a construction as best illustrated in FIG. 6 and has a horizontally extending arm 105 formed adjacent its bottom end and has a laterally extending arm 106 in addition to a shaft engaging portion 107. The trip lever 104 is pivotally mounted on the shaft 38 and is normally urged to rock in a counterclockwise direction (FIG. 4), by a contractile spring 108.

When the trip lever 104 is suspended on the pivot rod 38, the end of the horizontally extending arm 105 will be aligned with a bent-over portion 113 of an intermediate lever 114 that is urged by a contractile spring 115 to move downwardly and to oscillate in a counterclockwise direction (FIG. 4) about the pivot rod 38. The bent-over portion 113 of the intermedaite lever 114 not only lies in the path of the horizontally extending arm 105 of trip lever 104 but extends across the edge of a blocking lever 116, so that, when the lever 104 is rocked clockwise (FIGS. 3 and 4), it will rock the intermediate lever 114 clockwise, and the intermediate lever 114 will rock the blocking lever 116 clockwise against the action of a spring 117 attached to the blocking lever 116. The contractile springs 115 and 117, in the normal unoperated position of the universal bail 98, will hold the blocking lever 116 and the intermediate lever 114 in the position shown in FIG. 3 where the lower end 109 of the blocking lever 116 will lie in the path of the clutch trip lever 66 and will prevent the clutch trip lever from rocking clockwise (FIG. 2), about its pivot shaft 68 under the influence of the spring 69. The trip lever 104 is biased in a counterclockwise direction (FIG. 4) by its spring 115 and the arm 103 on it urges the universal bail 98 to the position shown in FIG. 3.

Each of the T-levers 39, as described hereinbefore is provided with a tie bar pivot arm 46, the lower end of which is movable across the path of the trip lever 66 and when the T-levers have been set in their selected positions under control of the keys 16 of the keyboard and the code bars 40 and 41, they will be locked in those positions by the trip lever 66 when it rocks clockwise (FIG. 2). Thus, when the trip lever 66 is released by blocking lever 116, it will move into position to block accidental displacement of the T-levers 39 until the code signal has been transmitted by the distributor 13. The distributor 13 (FIG. 1), is provided with a stop segment 122, a start segments 123 and six code segments 124 for controlling the transmission of a six-unit code in the manner commonly used for a "sixth level shift" modification of the well-known "Baudot" code.

As is usual in single revolution clutch mechanisms the clutch trip link 70 will be drawn to the right (FIG. 7) by the restoring arm 80 after having been moved to the left to trip the clutch and in being restored to its right-hand position just slightly beyond the position shown in FIGS. 2 and 7, it will reset the entire mechanism for another cycle of operation by sliding the left end (FIG. 2), of the lever 66 down past the end 109 of the blocking lever 116 whose spring 117 will move the blocking lever back to the blocking position shown in FIG. 3. When the clutch is tripped, it will supply power to drive the distributor shaft 87 through a single cycle of rotation thereby to rotate a distributor arm 132 mounted on the shaft 87 through one cycle of rotation. This will cause the distributor 13 to transmit pulses representative of a permutation code out, onto a signal line (not shown), or to a selector mechanism (also not shown), for controlling the operation of the type wheel assemblage 15.

The permutation code signals transmitted by the distributor 13 are selectively controlled by the plurality of contact springs 48 mounted in the contact block 52 which has been forced into contact block mounting slots 133 formed in the front and rear walls 27 and 28 of the structure 24 in the manner described in the copending application of L. C. Anderson, Jr., and A. A. Hagstrom mentioned hereinbefore. The contact springs 48 are urged to engage a common contact bar 135 by coiled springs 136 (FIG. 3) individual to them and will be blocked from engagement with the common contact bar 135 by surfaces 134 on the T-levers 39 which have been rocked to one position but will be permitted to engage with the common contact bar 135 where the code bars 40 and 41 have been moved by the keys 16 to rock the T-levers 39 to their opposite positions. The common contact bar 135 is interconnected through a wire in a cable 138 to a power source (not shown). The contact springs 48 are connected through wiring in the cable 138 to the code segments 124 of the distributor 13 and when any of the contact springs 48 are permitted by their associated T-levers 39, to engage the common contact bar 135 they will connect the power source through brushes on the distributor arm 132 to a common contact ring 137 which is in turn connected to the signal line and to the selector mechanism (not shown).

As soon as any key 16 on the keyboard is operated, other than a repeat key or a shift key, to be described more in detail hereinafter, the clutch trip lever 66 will be released and will rock clockwise (FIG. 2) to permit the restoring lever 63 (FIGS. 3 and 4) to move upwardly under the influence of its actuating spring 64 until the lip 65 engages the bottom 29 of the box-like structure 24.

The bail 53 is provided with a contact spring engaging portion 139 that extends transversely of all of the contact springs 48 and when the apparatus is in the condition illustrated in FIG. 3, this contact spring engaging portion 139 will hold all of the contact springs 48 out of contact with the common contact bar 135. At the end of a cycle of rotation of the distributor shaft 87, the clutch trip link 70 will be moved to the right (FIG. 2) and will restore the restoring lever 63 to the position shown in FIG. 3. However, as soon as any one of the signal transmitting keys 16 in the keyboard is operated, the lever 63 will be released by the clutch trip lever 66 and will permit the spring 64 to move the lever 63 upwardly to the position shown in FIG. 4 to move the portion 139 of the bail 53 in a clockwise direction (FIG. 4) to release the contact springs 48 for selective engagement with the common contact bar 135.

The keyboard 11 is provided with a repeat key 140 and shift keys 141 (FIG. 2) which do not affect the signal transmission in the same manner as the remainder of the keys in the keyboard and consequently, these keys 140 and 141 are of slightly different construction than the other keys in the keboard but they are guided for reciprocation in the same manner as the remaining keys in the keyboard.

One other key in the keyboard 11 is also slightly different from the keys 16 and this is the space key or bar 142 which has a stem 143 that is slidably mounted in a tab 144 formed out of the front wall 27 of the box-like structure 24, which tab is provided with a suitable slot for the reception of the lower end of the stem 143. A crossbar 145 is connected to the stem 143 and extends across the keyboard to a pair of cross-members 146 (see FIG. 2) positioned toward the opposite ends of the box-like structure 24 and each of these cross-members 146 may actuate a code bar arrangement of code bars 40 and 41 to selectively set T-levers for controlling the contact springs 48 to transmit a space signal. Unlike the character keys 16, the space bar 142 is urged to its unoperated position by coiled springs 147 surrounding shanks 148 extending downwardly (FIG. 3), from the cross-members 146.

Figure 4:
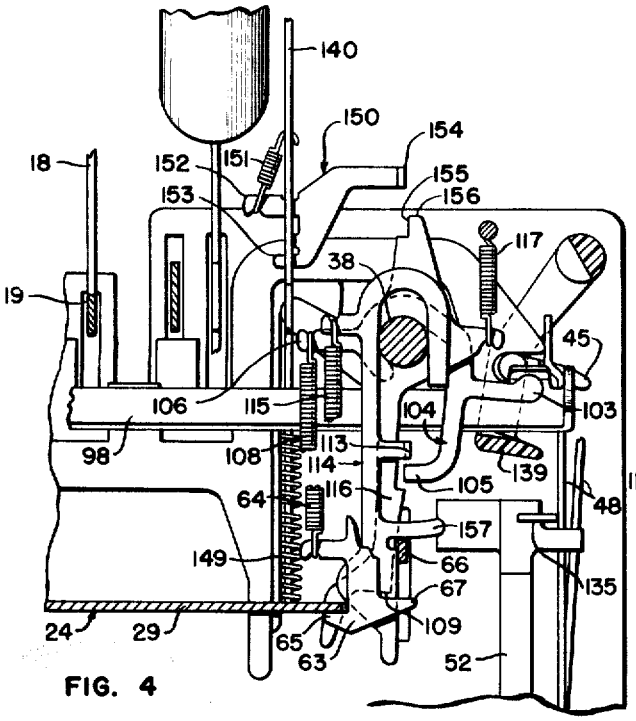
FIG. 4 is a fragmentary elevational view showing some of the parts shown in FIG. 3 in their operated positions.
Figure 5:
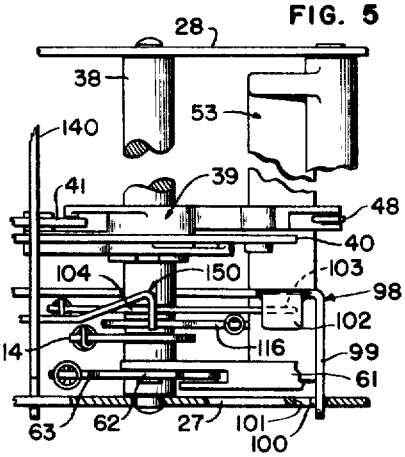
FIG. 5 is a fragmentary plan view taken substantially along the line 5—5 of FIG. 3.

The repeat key 140 is also provided with a coiled return spring 149 and as shown in FIGS. 3 and 4, has pivotally mounted on it, a repeat lever 150 for cooperation with the blocking lever 116. The repeat lever 150 is pivotally mounted on the repeat key 140 and is normally urged to the position shown in FIGS. 3 and 4 by a spring 151, suitable apertures being formed in the shank of the repeat key 140 for receiving an extending arm 152 of the lever 150 and for receiving a locating projection 153 of the lever. The lever 150 is provided with a transversely extending portion 154 which extends over the upper end of the blocking lever 116 and is arranged to register with a notch 155 cut into the upper end of the blocking lever 116 or to engage the upwardly extending end 156 of the blocking lever 116, if the blocking lever 116 is in the position shown in FIG. 3.

OPERATION

In the operation of the apparatus the depressing of any one of the keys 16 by an operator will, in addition to manipulating the code bars 40 and 41, also oscillate the universal bail 98. When the universal bail 98 is moved due to the depression of a key 16 or the space bar 142 from the position shown in FIG. 3 to the position shown in FIG. 4, it will rock the trip lever 104 clockwise (FIGS. 3 and 4) about the pivot rod 38 against the action of return spring 108. When the trip lever 104 is thus rocked clockwise (FIG. 3), against the action of its spring 108, it will engage the end of its horizontally extending arm 105 with the bent-over portion 113 of the intermediate lever 114 and will rock the intermediate lever 114 clockwise about the pivot rod 38. Since the bent-over portion 113 of the intermediate lever 114 also extends across the blocking lever 116, the blocking lever 116 will likewise be rocked in a clockwise direction from the position shown in FIG. 3 to the position shown in FIG. 4 thereby to release the lower end 109 of the blocking lever 116 from engagement with the clutch trip lever 66. When the clutch trip lever 66 is released by the lower end 109 of the blocking lever 116, the spring 69 (FIG. 2) will move the clutch trip link 70 to the left (FIGS. 2 and 7) thereby to rock the tripping lever 71 and the stop bail 82 clockwise (FIG. 7) about the clutch trip shaft 72 to release the clutch shoe 84 and initiate a cycle of rotation of the distributor drive shaft 87.

As the clutch trip lever 66 rocks clockwise about the shaft 68 it will move up to position to lock all of the T-levers 39 in the positions to which they have been set by their associated code bars 40 and 41 prior to the tripping of the clutch disc 86 and will also engage the undersurface of an arm 157 of the intermediate lever 114 to slide the intermediate lever 114 unpwardly on the pivot rod 38 to a point where the bent-over portion 113 of the intermediate lever 114 moves out of the path of the horizontally extending arm 105 of the trip lever 104. Upon disengagement of the horizontally extending arm 105 of the trip lever 104 from the bent over portion 113 of the intermediate lever 114 the spring 117 and the spring 115 will be permitted to restore the blocking lever 116 and intermediate lever 114 to the position shown in FIG. 4. In the position shown in FIG. 4 the intermediate lever 114 has returned to its original position. However, the blocking lever 116 will have moved its edge into engagement with the side of the clutch trip lever 66 so that when the clutch trip lever 66 is restored to the position shown in FIGS. 2 and 3 the blocking lever 116 will be permitted to move under the influence of its spring 117 to position to carry its lower end 109 over the upper edge of the clutch trip lever 66.

In the normal operation of the apparatus the actuation of a key 16 in the keyboard will thus, through the cooperation of the universal bail 98, trip lever 104, and blocking lever 116, permit the clutch trip lever 66 to trip the clutch. However, at the end of one cycle of rotation of the distributor shaft 87 the clutch trip lever 66 will have been moved back to position below the lower end 109 of the blocking lever 116 and although the key 16 on the keyboard is held in its operated position the clutch will only go through one cycle due to the fact that although the trip lever 104 is held in its actuated position as indicated in FIG. 4 the intermediate lever 114 will not be permitted to move back to the position shown in FIG. 3 because the bent-over portion 113 of it will engage the upper surface of the horizontally extending arm 105 of the trip lever 104 and consequently the spring 117 will be permitted to rock the blocking lever 116 to blocking relation with the clutch trip lever 66. Thus, although a key 16 may be depressed and held in a depressed or actuated position only one permutation code signal will be transmitted and the clutch will be tripped only one time until the key 16 is released to permit the universal bail 98 to move back to the position shown in FIG. 3 thereby to permit the spring 115 to return the trip lever 104 to its unactuated position whereupon the spring 108 will be permitted to move the intermediate lever 114 back to its unoperated position as shown in FIG. 3.

When the clutch trip lever 66 is restored to normal position as shown in FIGS. 2 and 3 by the restoring roller 92 acting on the restoring arm 80 of the tripping lever 71, the contact restoring lever 63 will also be moved from the position shown in FIG. 4 to the position shown in FIG. 3 to rock the contact spring restoring bail 53 to the position shown in FIG. 3.

If it is desired to send the same code combination repeatedly, the repeat key 140 may be operated and thereafter the key 16, representing the character code combination to be transmitted over the signal line may be depressed. As long as the repeat key 140 and the selected key 16 are held operated the code combination, which had been set up by the actuation of a key 16, will be sent repeatedly by the distributor 13 due to the fact that when the repeat key 140 is depressed it will move the transversely extending portion 154 of the repeat lever 150 down onto the end 156 of the blocking lever 116 and when the blocking lever 116 is rocked clockwise from the position shown in FIG. 3 to the position shown in FIG. 4, the spring 151 will rock the repeat lever 150 into the notch 155 of the blocking lever 116 thereby to hold the blocking lever in the position shown in FIG. 4. With the blocking lever held in the position shown in FIG. 4 the clutch trip lever 66 will be permitted to move upwardly as viewed in FIGS. 3 and 4, clockwise as viewed in FIG. 2, each time it is restored by the reset or restoring arm 80. Since the code bars 40 and 41 will remain in the position to which they have been moved and in which they are held by the key 16 the T-levers 39 will remain in their set positions and the code combination as selected by the key 16 which was actuated prior to the actuation of the repeat key 140 will have its code combination transmitted repeatedly. As soon as the repeat key 140 is released, its spring 149 will return it to the position shown in FIGS. 3 and 4 and the repeat lever 150 will therefore be moved out of blocking engagement with the blocking lever 116.

Although a particular embodiment of the invention is shown in the drawings and described in the foregoing specification, it will be understood that the invention is not limited to that specific embodiment, but is capable of modification and rearrangement, and substitution of parts and elements without departing from the scope of the invention.

What is claimed is:

1. A keyboard controlled telegraph transmitter comprising a plurality of keys, contacts permutatively controlled by said keys, a distributor for sequentially connecting said contacts to a transmission line, a clutch for supplying driving power to said distributor, a clutch trip member actuatable to initiate a cycle of operation of said distributor, means common to said keys and operable upon actuation of any one of said plurality of keys, a trip lever for actuation by said means common to said keys, an intermediate lever normally disposed for actuation by said trip lever and movable out of the position in which it is normally disposed, and a blocking lever normally blocking operation of said clutch trip member and movable out of blocking relation to said clutch trip member by said intermediate lever, said intermediate lever having an arm for engagement by the clutch trip member to move said intermediate lever out of position to be actuated by the trip lever and for engagement by the clutch trip lever to hold the intermediate lever in the position to which it is moved where it will release the blocking lever to re-engage with the clutch trip member thereby to prevent a second tripping of the clutch until the actuated key is released.

2. A keyboard controlled telegraph transmitter comprising a plurality of keys, contacts permutatively controlled by said keys, a distributor for sequentially connecting said contacts to a transmission line, a clutch for supplying driving power to said distributor, a clutch trip member actuatable to initiate a cycle of operation of said distributor, a universal bail common to said keys and operable upon actuation of any one of said plurality of keys, a trip lever for actuation by said universal bail, an oscillatable and reciprocable intermediate lever normally disposed for oscillation by said trip lever and reciprocable out of cooperative association with said trip lever, and a blocking lever normally blocking operation of said clutch trip member and movable out of blocking relation to said clutch trip member by oscillation of said intermediate lever, said intermediate lever having an arm for engagement by the clutch trip member to reciprocate said intermediate lever out of cooperative association with the trip lever and for engagement by the clutch trip lever to hold the intermediate lever in the position to which it is moved to release the blocking lever for re-engagement with the clutch trip member thereby to prevent a second tripping of the clutch until the actuated key is released.

3. A keyboard controlled telegraph transmitter comprising a plurality of keys, contacts permutatively controlled by said keys, a distributor for sequentially connecting said contacts to a transmission line, a clutch for supplying driving power to said distributor, a clutch trip member actuatable to initiate a cycle of operation of said distributor, means common to said keys and operable upon actuation of any one of said plurality of keys, a trip lever for actuation by said means common to said keys, a slidably and pivotally supported intermediate lever normally disposed for pivoting movement by said trip lever and slidable out of cooperative association with said trip lever, and a blocking lever normally blocking operation of said clutch trip member and movable out of blocking relation to said clutch trip member by pivotal movement of said intermediate lever, said intermediate lever having an arm for engagement by the clutch trip member to slide said intermediate lever out of cooperative association with the trip lever and for engagement by the clutch trip lever to hold the intermediate lever in the position to which it is moved to release the blocking lever for re-engagement with the clutch trip member thereby to prevent a second tripping of the clutch until the actuated key is released.

4. In a key controlled telegraph transmitter having a plurality of permutatively settable members, keys for actuating said members and contacts controlled by said members, a cyclically operable distributor having transmitting segments connected to said contacts, a universal control member operated by said keys each time any one of them is operated, and means actuated by said universal control member for initiating a single cycle of operation of said distributor each time a key is operated comprising a pivot rod, a trip lever oscillatable on said pivot rod by said universal control member, an intermediate lever oscillatably, and slidably mounted on said pivot rod for oscillation by said trip lever, a blocking lever oscillatable about said pivot rod from a blocking position to a non-blocking position by said intermediate lever, a clutch trip lever normally blocked by said blocking lever and operable to initiate a cycle of operation of said distributor when the blocking lever is moved to the non-blocking position, means on said intermediate lever for engagement by said trip lever to oscillate the intermediate lever and for engagement by the clutch trip lever to slide the intermediate lever out of position to be oscillated, and spring means to oscillate the intermediate lever to position to release said blocking lever for movement back to blocking position.

5. In a key controlled telegraph transmitter having a plurality of permutatively settable members, keys for actuating said members and contacts controlled by said members, a cyclically operable distributor having transmitting segments connected to said contacts, a universal control member operated by said keys each time any one of them is operated, and means actuated by said universal control member for initiating a single cycle of operation of said distributor each time a key is operated comprising a pivot rod, a trip lever oscillatable on said pivot rod by said universal control member, an intermediate lever oscillatably and slidably mounted on said pivot rod for oscillation by said trip lever, a blocking lever oscillatable about said pivot rod from a blocking position to a non-blocking position by said intermediate lever, a clutch trip lever normally blocked by said blocking lever and operable to initiate a cycle of operation of said distributor when the blocking lever is moved to the non-blocking position, means in said distributor for restoring said clutch trip lever to position to be blocked by said blocking lever once in each cycle of said distributor, means on said intermediate lever for engagement by said trip lever to oscillate the intermediate lever and for engagement by the clutch trip lever to slide the intermediate lever out of position to be oscillated after each oscillation of the intermediate lever, and spring means to oscillate the intermediate lever to position to release said blocking lever for movement back to blocking position.

6. In a key controlled telegraph transmitter having a plurality of permutatively settable members, keys for actuating said members and contacts controlled by said members, a cyclically operable distributor having transmitting segments connected to said contacts, a universal control member operated by said keys each time any one of them is operated, and means actuated by said universal control member for initiating a single cycle of operation of said distributor each time a key is operated comprising a pivot rod, a trip lever oscillatable on said pivot rod by said universal control member, an intermediate lever oscillatably and slidably mounted on said pivot rod for oscillation by said trip lever, a blocking lever oscillatable about said pivot rod from a blocking position to a non-blocking position by said intermediate lever, a clutch trip lever normally blocked by said blocking lever and resiliently urged to move beyond said blocking lever to initiate a cycle of operation of said distributor when the blocking lever is moved to the non-blocking position, means operated by said distributor to restore said clutch trip lever to its blocked position, means on said intermediate lever for engagement by said trip lever to oscillate the intermediate lever and for engagement by the clutch trip lever to slide the intermediate lever out of position to be oscillated, spring means to oscillate the intermediate lever to position to release said blocking lever for movement back to blocking position and spring means operable to restore the blocking lever to blocking position when it is released by the intermediate lever.

7. An apparatus as defined in claim 6 wherein manually operable means are provided for selectively preventing the return of the blocking lever to blocking relation with the clutch trip lever to cause the distributor to operate continuously.

8. An apparatus as defined in claim 6 wherein a repeat key is provided having a repeat lever on it which upon operation of the repeat key, resiliently engages one surface of the blocking lever in blocking position and which, upon operation of any one of the plurality of keys and consequent oscillation of the blocking lever, moves to engagement with another surface of the blocking lever to prevent the blocking lever from returning to blocking position with respect to the clutch trip lever, thereby to cause repeated cycles of the distributor and repeated transmission of the same code combination.

*9. In a key controlled telegraph transmitter having a plurality of permutatively settable members, keys for actuating said members and contacts controlled by said members, a cyclically operable distributor having serializing elements connected to said contacts, a universal control member operated by said keys each time any one of them is operated, and means actuated by said universal control member for initiating a single cycle of operation of said distributor each time a key is operated comprising a pivot rod, a trip lever oscillatable on said pivot rod by said universal control member, an intermediate lever oscillatably, and slidably mounted on said pivot rod for oscillation by said trip lever, a blocking lever oscillatable about said pivot rod from a blocking position to a non-blocking position by said intermediate lever, a distributor-start lever normally blocked by said blocking lever and operable to initiate a cycle of operation of said distributor when the blocking lever is moved to the non-blocking position, means on said intermediate lever for engagement by said trip lever to oscillate the intermediate lever and*

*for engagement by the distributor-start lever to slide the intermediate lever out of position to be oscillated, and spring means to oscillate the intermediate lever to position to release said blocking lever for movement back to blocking position.*

References Cited by the Examiner

The following references, cited by the Examiner, are of record in the patented file of this patent or the original patent.

UNITED STATES PATENTS

| | | | |
|---|---|---|---|
| 1,595,472 | 8/1926 | Krum | 178—27 |
| 2,250,717 | 7/1941 | Long et al. | 178—25 |
| 2,859,277 | 11/1958 | Pratt | 178—25 |

NEIL C. READ, *Primary Examiner.*

ROBERT H. ROSE, *Examiner.*

A. J. DUNN, T. A. ROBINSON, *Assistant Examiners.*